US006275950B1

United States Patent
Yeh

(10) Patent No.: US 6,275,950 B1
(45) Date of Patent: Aug. 14, 2001

(54) ADJUSTABLE PCI ASYNCHRONOUS CLOCK DEVICE

(75) Inventor: Henry Yeh, Chung-Li (TW)

(73) Assignee: Twinhead International Corp., Taiwan ( * ) Notice: Subject to any disclaimer, the term of this patent is extended or adjusted under 35 U.S.C. 154(b) by 0 days.

(21) Appl. No.: 09/248,866

(22) Filed: Feb. 11, 1999

Related U.S. Application Data

(63) Continuation-in-part of application No. 08/959,503, filed on Oct. 28, 1997, now abandoned.

(51) Int. Cl.$^7$ .................................................. G06F 1/04
(52) U.S. Cl. ............................................ 713/401; 713/503
(58) Field of Search ................................... 713/400, 401, 713/500, 501, 503, 600

(56) References Cited

U.S. PATENT DOCUMENTS

| | | | |
|---|---|---|---|
| 5,696,949 | * 12/1997 | Young | 713/400 |
| 5,881,271 | * 3/1999 | Williams | 713/401 |
| 5,884,052 | * 3/1999 | Chambers et al. | 710/107 |
| 6,006,327 | * 12/1999 | Chang et al. | 713/1 |

* cited by examiner

Primary Examiner—Dennis M. Butler
(74) Attorney, Agent, or Firm—Proskauer Rose, LLP

(57) ABSTRACT

Disclosed is an adjustable PCI asynchronous clock device in which by using the settings of firmware after the control line is monitored and selected by using a multiplexer via an I/O port, each of the PCI slots chooses one delay unit of the time delay means, the clock signal for each kind of PCI slot is delayed by the time delay means in order to regulate the clock signals of the chip set on the PCI add-on cards to be synchronous to the computer signals of the system chip set, so that the add-on cards match the PCI slots. The clock device comprises an I/O port, a plurality of multiplexers, and a time delay means.

2 Claims, 3 Drawing Sheets

ADJUSTABLE PCI ASYNCHRONOUS CLOCK DEVICE

This application is a continuation-in-part of U.S. patent application Ser. No. 08/959,503, filed on Oct. 28, 1997 now abandoned.

FIELD OF THE INVENTION

This invention relates to an adjustable PCI asynchronous clock device, particularly to a circuit by which the clock signal of the PCI slot is regulated so that the clock signal of add-on card and the computer signal of a computer are synchronous and so that the add-on card can match the PCI slot.

BACKGROUND OF THE INVENTION

Currently, the greatest drawback encountered in mother board manufactures is that, in mounting the add-on cards, after all kinds of the add-on cards are inserted accurately into the PCI slots, a few cards cannot work properly. Only a few cards can work normally, which is the so-called matching problem because not all the add-on cards match with the PCI slots in signal transmission. The main reason of the matching problem is that at PCI bus, no matter the computer signals are command, address, data, etc., the rising edge of the PCI clock is used to latch the computer signals, and if the PCI clock signal deviates from the computer signal, the setup time or holding time obtained by latching the computer signal are insufficient. Further, the design and manufacturing of the system chip set of the mother board are different from those of the chip set of the add-on cards, which makes the matching problem severe and difficult to be solved. The user usually finds the matching problem when the user adds peripheral device, which results in the returning of the computer and the difficulty of repairing service.

SUMMARY OF THE INVENTION

It is an object of the present invention to provide an adjustable PCI asynchronous clock device in which by using the settings of firmware, after the control line is monitored and selected by using a multiplexer via a I/O port, each of the PCI slots chooses one delay unit of the time delay means. The clock signal for each kind of PCI slot is delayed by the time delay means in order to regulate the clock signals of the chip set on the PCI add-on cards to be synchronous to the computer signals of the system chip set so that the add-on cards match the PCI slots.

These and other features of the present invention will become apparent from the following descriptions when read in conjunction with the accompanying drawings.

BRIEF DESCRIPTIONS OF THE DRAWING

DETAILED DESCRIPTIONS OF THE INVENTION

Figure 1:
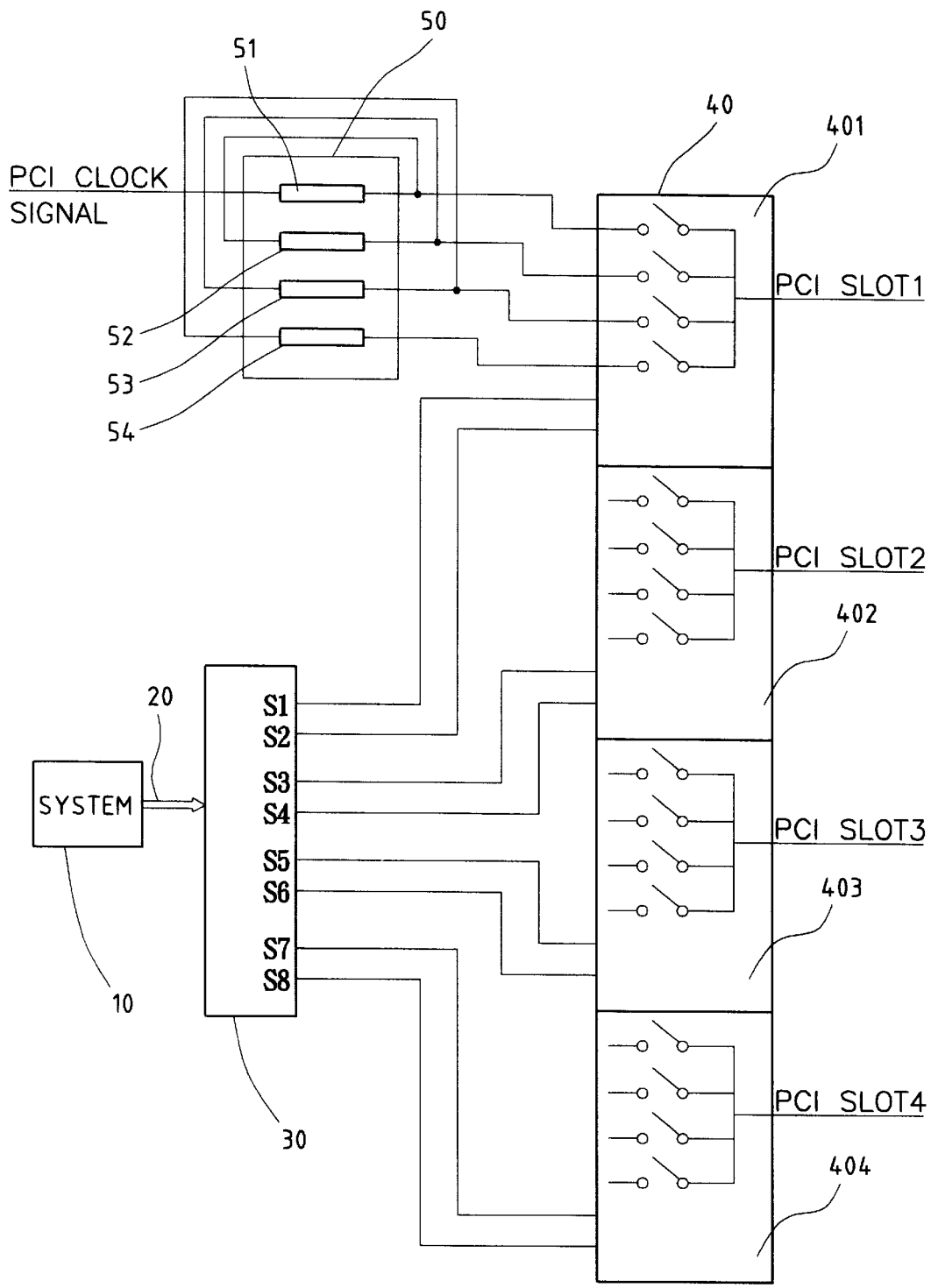
FIG. 1 is a schematic view of the a portion of the circuit of the adjustable PCI asychronous clock device of FIG. 2 in accordance with the present invention.
Figure 2:
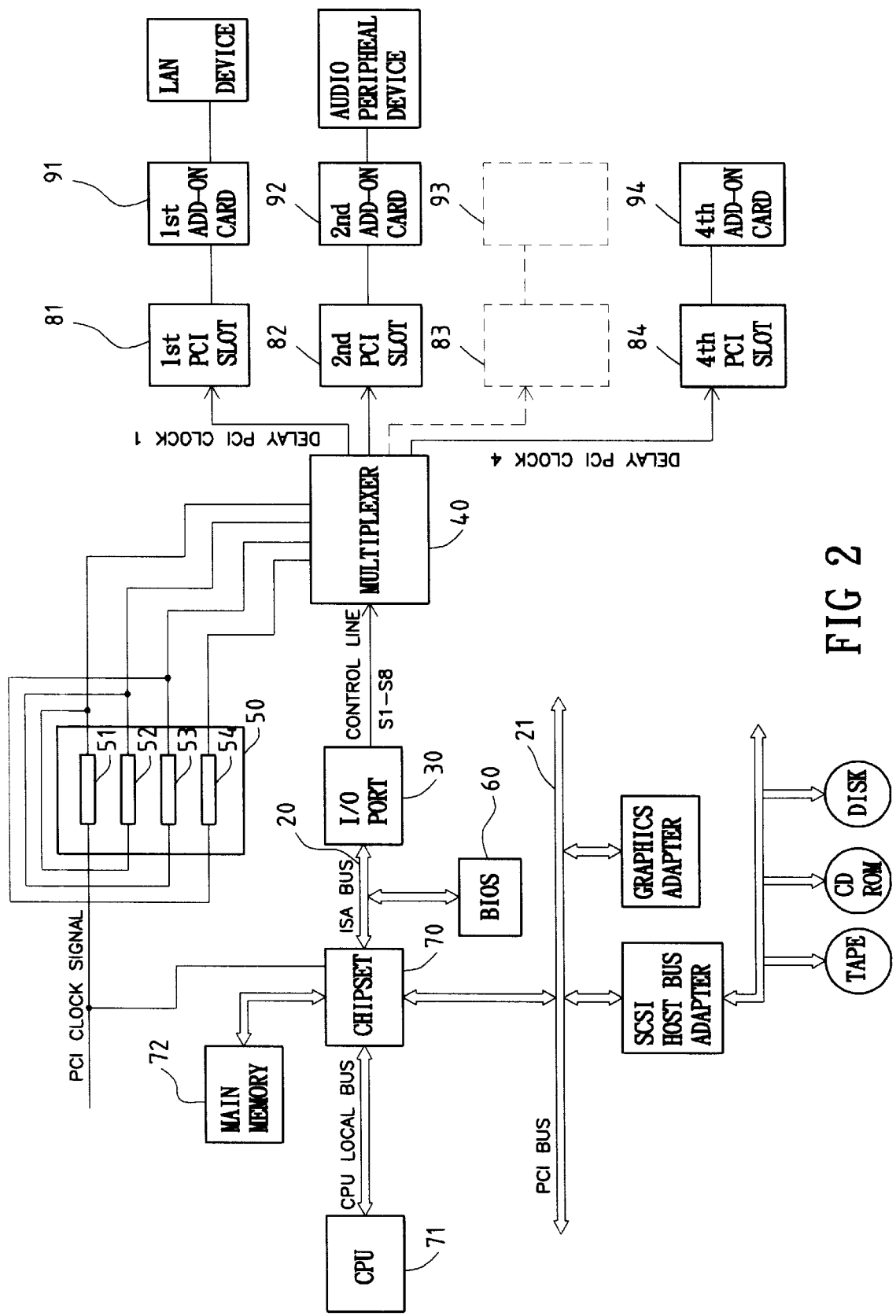
FIG. 2 is a schematic view of the a portion of the circuit of the adjustable PCI asynchronous clock device in accordance with the present invention.
Figure 3:
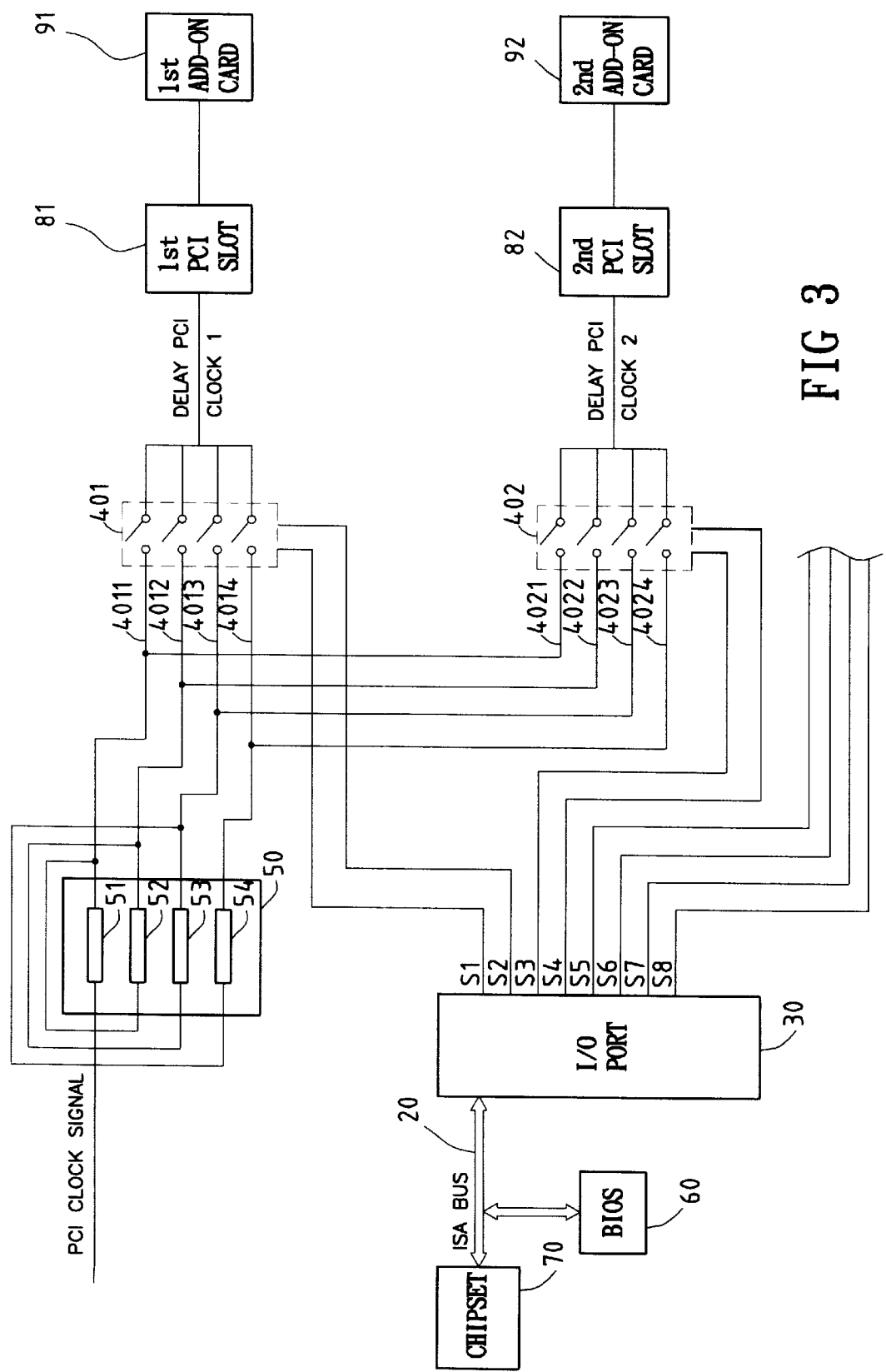
FIG. 3 is a schematic view of the a portion of the circuit of the adjustable PCI asynchronous clock device of FIG. 2 in accordance with the present invention.

Please see FIGS. 1–3 which shows the circuit of the present invention. In an embodiment of the present invention, four PCI slots (PCI SLOT1–4) are used for illustration. In the present invention, the settings, which are set by using firmware (BIOS), are transmitted from a system 10 via a bus 20 to an I/O port 30. The bit values (S1–S8) of the I/O port 30 are used as control signal of each of the control lines for a multiplexer 40. In this embodiment, one multiplexer means 40 corresponds to one of the PCI slots (PCI SLOT 1–4) and includes four multiplex units 401, 402, 403 and 404. Each of the multiplexer means 40 has four input lines in association with two control lines. In other words, the I/O port 30 has 8 bits (S1–S8) to be used as control signals of the control lines. When the number of the PCI slots is more than 4, the number of bits of the I/O port should be correspondently increased. For example, for 8 PCI slots, sixteen control lines should be provided and the number of bits of the I/O port should be 16.

In one of the embodiments, the time delay means 50 has four delay units 51–54. The PCI clock signal is input into the input of the first delay unit 51. The output of the first delay unit 51 is connected to the input of one multiplexer 40 and to the input of the second delay unit 52. The output of the second delay unit 52 is connected to one of the input of the other one multiplexer 40 and to the input of the third delay unit. The connection between each of the multiplexers and the delay units are made in this way. If the delay time for the first delay unit 51 is one unit time, the delay time for the fourth delay unit is four unit times.

After the system firmware is set, the selection of one of the multiplexers is controlled by the I/O port 30. When an add-on card is inserted into the first PCI slot PCI SLOT1, the control lines So, S2 drive the switches in the multiplexers 40 in order to selectively connect the output of one of the delay units 51–54 to one of the slots PCI SLOT1–SLOT4. One of the delayed clock signals obtained by using the delay unit is sent to the PCI slot PCI SLOT1. Thus, the computer signals, such as command, address, data, etc., on the PCI bus do not deviate from the PCI clock signal. The matching problem is solved.

FIG. 2 illustrates a PCI system constructed computer, in accordance with the present invention, and includes a CPU 71, a chipset 70, a main memory 72, a BIOS 60, an I/O port 30, a multiplex means 40, a time delay means 50 and PCI SLOTs 81, 82, 83 and 84.

The user stores correct values in the BIOS 60 according to the matching character of add-on cards 91–94. Then, by the chipset 70 and CPU 71, the set value are sent to the I/O port 30 through ISA BUS 20. The multiplex selecting switch within the multiplex means 40 is controlled by the bit values on the control line S1–S8 in the I/O port 30. As stated, the multiplex means 40 is formed by four multiplex units 401–404. The set value on input ends 4011 and 4012 of the multiplex unit 401 serve to control the four multiplex selecting switches of the multiplex unit 404. A delay PCI clock selected from four PCI clock of the four delay units is sent to the 4th PCI slot 84, according to the set value of S7 and S8.

In FIG. 3, the delay PCI clock 1 signal from the multiplex unit 401 is sent to the 1st add-on card through the 1st PCI SLOT 81. Similarly, the delay PCI clock 2 signal from the multiplex unit 402 is sent to the 2nd add-on card through the 2nd PCI SLOT 82, and so on.

While the invention has been particularly shown and described with reference to the preferred embodiment, it will be understood by those skilled in the art that various changes in form and details may be made without departing from the spirit and scope of the invention. Although only the preferred embodiments of this invention were shown and described in the above descriptions, it is requested that any modification or combination that comes within the spirit of this invention be protected.

We claim:

1. An adjustable PCI asychronous clock device having a plurality of PCI slots, which device selectively delays a PCI clock signal in order to match a computer signal of a system chip set with a clock signal of a chip set of a PCI add-on card, which comprises:

an I/O port for generating a control signal;

a plurality of multiplexers having a plurality of control signals on control lines of which are selectively controlled by the I/O port and a output of which is connected to each of the PCI slots; and time delay means for delaying the PCI clock signal, having a plurality of delay units, output of the time delay means being connected to each of the PCI slots;

output of I/O port being set by a firmware so that each of the PCI slots selects one of the delay units, the PCI clock signal associated with each of the PCI slots is delayed by the delay unit in order to regulate the clock signal of the chip set on the PCI add-on card to be synchronous to the computer signals of the system chip set, so that the add-on cards match the PCI slots.

2. The adjustable PCI asychronous clock device as claimed in claim 1 wherein the time delay means comprises a plurality of delay units the number of which corresponds to the number of multiplexers, the output of each delay unit is connected to the input of the other delay unit for forming different time delays.

* * * * *